June 1, 1937.  O. R. BENSON  2,081,978
VEHICLE STABILIZER
Filed May 11, 1935
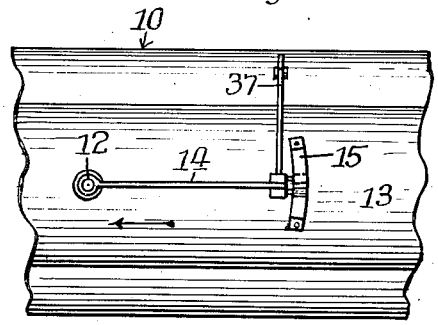
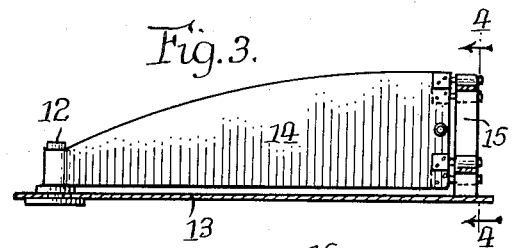
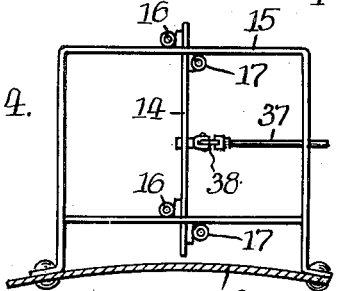
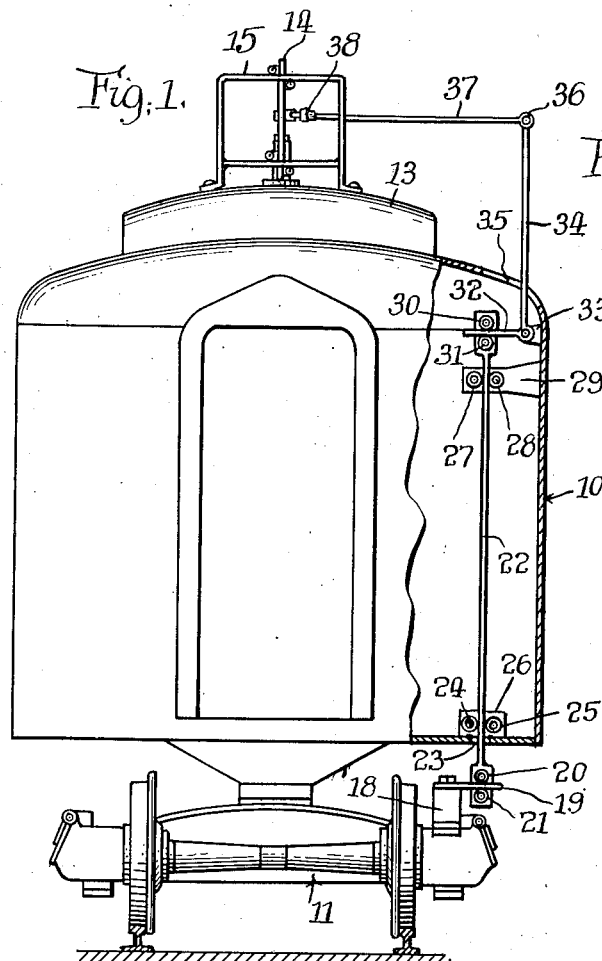
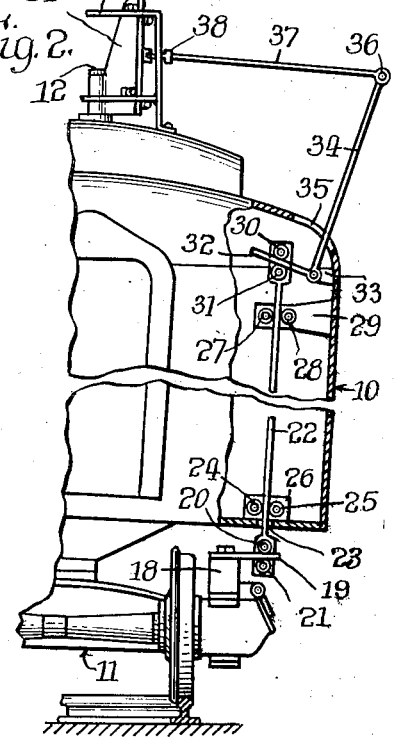
Inventor:
Oliver R. Benson,
By Fisher, Clapp, Soans & Pond, Attys.

Patented June 1, 1937

2,081,978

UNITED STATES PATENT OFFICE 2,081,978

VEHICLE STABILIZER

Oliver R. Benson, Chicago, Ill.

Application May 11, 1935, Serial No. 20,943

7 Claims. (Cl. 105—210)

This invention relates to attachments for vehicles such as railway cars, automobiles, and the like, the purpose of which is to lessen the side tipping tendency of the body of the vehicle when rounding curves at high speed.

It has heretofore been proposed to provide means for opposing, through wind resistance, the side tipping tendency of a vehicle body traveling on a curve at high speed by pivotally mounting on the roof of the body a stabilizing fin and providing means for angling the fin in a direction to create air resistance thereon to the sidewise tipping tendency of the vehicle body. In some instances manually operated means has been provided for suitably angling the fin, and in other cases power operated means, in the nature of a servo motor mechanism has been provided in association with a pendulum controlling, by its swinging movements, the valves of the motor.

The device of my present invention employs a pivoted stabilizer fin preferably mounted on the roof of the vehicle body, and, as an operating means therefor employs a mechanism that is actuated by relative vertical movement of the body and truck of the vehicle. It is well known that when a vehicle such as a railway car or an automobile rounds a curve at considerable speed, the body, under centrifugal force, tips sidewise so that the vertical distance between the body and the truck on one side is decreased and on the other side is increased. My present invention takes advantage of this relative movement of body and truck to effect the proper angling of the fin to thereby provide air resistance on the fin to the centrifugal tendency of the body.

In view of the modern tendency toward greater speed of both railway trains and automobiles, the danger of accidental upset or overturning on curves has been substantially increased. Of course, in railway practice the track is banked by elevating the outside rail on curves, but hitherto such banking of the track has been effected to accommodate maximum speeds of approximately sixty miles per hour. The modern stream-lined articulated trains are capable of twice that speed, and consequently to render travel safe on curves, it is desirable to provide means on the vehicle itself to oppose the tipping tendency; and the present invention has been designed to accomplish this in an entirely automatic manner in the case of both railway cars and automobiles.

A simple embodiment of the invention, as applied to a railway car, is illustrated in the accompanying drawing, in which:

Fig. 1 is a rear elevation, viewed with reference to the direction of travel of a railway car, parts thereof being shown in vertical section to illustrate operating connections between a journal box of the truck and the stabilizer fin pivoted on the roof of the car; the parts being shown in normal position as when the car is running on straight track.

Fig. 2 is a fragmentary view, similar to Fig. 1, and showing the relative positions of the parts when the car is rounding a left-hand curve.

Fig. 3 is a side elevation of the stabilizer fin shown as pivotally mounted on the roof of the car.

Fig. 4 is an enlarged vertical section on the line 4—4 of Fig. 3, showing in elevation a supporting and guiding frame for the free end of the stabilizer fin.

Fig. 5 is a fragmentary top plan view on a reduced scale.

Referring to the drawing, 10 designates as an entirety the body, and 11 the truck of a railway car. 12 designates a fixed pivot stud mounted on the deck roof 13 of the car, and swiveled on the stud 12 is a stabilizer fin 14 preferably of substantially the form illustrated in Fig. 3. Also mounted on and crosswise of the deck roof 13 is a guide frame 15 of substantially the form shown in Figs. 1 and 4, the horizontal limbs of which frame are engaged by two pairs of upper and lower rollers 16 and 17 mounted on the free end of the fin 14. These rollers 16 and 17 travel freely on the horizontal limbs of the frame 15, and since the rollers of each pair engage one of the limbs on both sides of the latter they serve to confine the fin against either up or down movement, and thus relieve the pivot stud 12 of binding strains and so insure free and easy pivotal movement.

Describing next the fin actuating means, mounted on one of the journal boxes of the truck is a block 18 on which is mounted a horizontal outwardly extending bar 19. The bar 19 extends between upper and lower rollers 20 and 21 journaled on the lower widened end of a rod 22 that extends upwardly through a slot 23 in the floor of the car body and is guided in its vertical movements by a lower pair of rollers 24, 25 on a block 26 secured to the floor of the car body, and an upper pair of rollers 27 and 28 on a bracket 29 secured to the side wall of the car body. The upper widened end of the rod 22 carries upper and lower rollers 30 and 31 that engage between them the short arm 32 of a bell crank lever that is pivoted to a bracket 33 on the side wall. The long arm 34 of the bell crank lever extends upwardly through a slot 35 in the car roof and at its upper end is pivoted at 36 to a link 37 that is connected by a universal joint 38 to the rear free end of the fin 14, substantially mid-height of the latter.

Describing the operation, and assuming that in Figs. 1 and 2 the car is traveling in a direction forwardly of the observer, when the car is on straight track, as shown in Fig. 1, the stabilizer fin is parallel with the longitudinal median line of the car, offering substantially no resistance to the forward movement, and the operating parts are in substantially the relative positions shown in Fig. 1. When, however, the car enters on a left hand curve, as indicated in Fig. 2, if it is traveling at high speed, the body lurches or tilts to the right so that the right-hand side of the car body approaches the truck. And since the rod 22 is connected to the truck, it undergoes an upward movement relatively to that side of the car body, which causes the elbow lever 32, 34, to swing, as shown in Fig. 2, and this, through the link 37, angles the fin 14 so that the right-hand side of the fin meets a heavy wind resistance, which, of course, increases with an increase in the speed of the car, and at the same time a vacuum or suction effect is created on the opposite side of the fin, so that the two together present a high resistance to the centrifugal force and either maintain the car body upright or greatly reduce the side sway. The fin 14 may, of course, have any suitable or desired area whereby to secure the desired effect, but when it is remembered that the air resistance varies as the square of the speed, and that the fin is located at the highest point on the car body where its mechanical advantage is greatest, it will be apparent that at speeds of and exceeding one hundred miles per hour, the stabilizer fin may be relatively small consistently with its effectiveness.

In case the vehicle encounters a right-hand curve, the body sways to the left. This obviously increases the distance between the right-hand side of the car body and the right-hand side of the truck above the normal distance shown in Fig. 1. This obviously rocks the elbow lever 32, 34 in the opposite direction, and the link 37 angles the fin 14 to the opposite or left side, with the same stabilizing effect.

The described connection of the lower end of the rod 22 to the journal box, consisting of the bar 19 and rollers 20, 21, is preferred because readily accommodating the slight relative lateral vibration of the body and truck even when traveling on straight track.

As an adjunct of railway equipment the invention is especially useful on the high speed Diesel motor-powered articulated trains that are now coming into use which maintain speeds around one hundred miles per hour and wherein, of course, the cars always travel with the same end foremost. The device is also particularly useful when applied to the rear car of the train to resist the tendency to whip the rear car off the track when rounding a curve. It may also be noted that in railway practice the stabilizer fin located forwardly of the horizontal center of mass of the car body applies a turning moment to the car body which reduces the thrust of the wheel flanges of the foremost truck on the outer rail, and this reduces the tendency of the front wheels to override or jump the track.

To illustrate the principle of the invention I have shown it as applied to a railway car; but it is manifest that it is equally applicable to an automobile wherein, when rounding a curve at high speed, the body of the car tilts sidewise relatively to the wheels, and wherein the bar 19 or its equivalent may be mounted on the rear axle housing or bridge.

I have herein shown and described one very simple and practical physical embodiment of the principle of the invention; but, believing myself to be the first to automatically angle a stabilizer fin through means actuated by relative vertical movement of the body and truck of the vehicle so as to create an air resistance on the fin to the sidewise tipping tendency of the body, I do not limit the invention to the specific embodiment illustrated, but reserve all such variations, modifications and mechanical equivalents as fall within the spirit and purview of the claims.

I claim:

1. In a device of the character described, the combination with a vehicle, of a stabilizer fin pivotally mounted on the body of said vehicle, and means actuated by relative vertical movement of the body and truck of the vehicle for angling said fin in a direction to create air resistance thereon to a sidewise tipping tendency of said body.

2. In a device of the character described, the combination with the body and truck of a vehicle, of a stabilizer fin pivotally mounted at one end thereof on said body, and lever and link connections between said truck and the free end of said fin operative, when the vehicle rounds a curve, to angle said fin in a direction to create air resistance thereon to the centrifugal tipping tendency of said body.

3. In a device of the character described, the combination with the body and truck of a vehicle, of a stabilizer fin pivotally mounted at one end thereof on the roof of said body, a guide engaged with the free end of said fin permitting lateral but preventing vertical movement of said fin, and articulated connections between said truck and the free end of said fin operative, when the vehicle rounds a curve, to angle said fin in a direction to create air resistance thereon to the centrifugal tipping tendency of said body.

4. In a device of the character described, the combination with the body and truck of a vehicle, of a stabilizer fin pivotally mounted at its forward end on the roof of said body, and connections between a side of said truck and said fin operative, under variations in distance between the said side of the truck and the corresponding side of the body, to angle said fin in a direction to create air resistance thereon to the centrifugal tipping tendency of said body when rounding a curve.

5. In a device of the character described, the combination with the body and truck of a vehicle, of a stabilizer fin pivotally mounted at its forward end on the roof of said body, a guide engaged with the rear end of said fin permitting lateral but preventing vertical movement of said fin, and lever and link connections between a side of said truck and the rear end of said fin operative, under variations in distance between the said side of the truck and the corresponding side of the body, to angle said fin in a direction to create air resistance thereon to the centrifugal tipping tendency of said body when rounding a curve.

6. In combination with a railway car, a stabilizing attachment to oppose centrifugal force when rounding a curve, comprising a stabilizer fin pivoted on the car roof, a rod connected to and extending upwardly from an element of the truck at one side of the transverse center thereof, and connections between said rod and said fin through which, when the car body tilts sidewise, said fin is angled in a direction to create air resistance thereon opposing the tilting of the car body.

7. In combination with a railway car, a stabilizing attachment to oppose centrifugal force when rounding a curve, comprising a stabilizer fin pivoted at one end thereof on the car roof, a rod connected to and extending upwardly from a side element of the truck, an elbow lever pivoted on the car body with one arm of which said rod is engaged, and a link connecting the other arm of said lever to said fin.

OLIVER R. BENSON.